(12) United States Patent
Martin et al.

(10) Patent No.: US 8,639,227 B1
(45) Date of Patent: Jan. 28, 2014

(54) PROVIDING DIGITAL CONTENT USABILITY FOR A MOBILE DEVICE USER

(71) Applicant: Sprint Communications Company L.P., Overland Park, KS (US)

(72) Inventors: Geoffrey Martin, Overland Park, KS (US); Jonathan Kindred, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 13/687,773

(22) Filed: Nov. 28, 2012

Related U.S. Application Data

(62) Division of application No. 12/342,950, filed on Dec. 23, 2008, now Pat. No. 8,351,911.

(51) Int. Cl.
*H04M 3/00* (2006.01)
*G06F 15/16* (2006.01)

(52) U.S. Cl.
USPC ......... 455/414.2; 455/419; 709/232; 709/219

(58) Field of Classification Search
USPC .......... 455/419, 420, 426, 466; 709/232, 219; 717/173
See application file for complete search history.

(56) References Cited

U.S. PATENT DOCUMENTS

2003/0027563 A1* 2/2003 Herle et al. .................... 455/419
2006/0194181 A1* 8/2006 Rosenberg .................... 434/317

FOREIGN PATENT DOCUMENTS

JP 2002-077071 * 5/2000 ............. H04B 17/00

* cited by examiner

*Primary Examiner* — Nizar Sivji

(57) ABSTRACT

A method, system, and medium are provided for ensuring usability of digital content on a mobile device. In exemplary aspects, digital content on a mobile device is rendered unusable, such as where a download is interrupted. The usability of the digital content is automatically restored to the mobile device without user intervention. In situations in which the mobile device is unavailable, digital content might be restored to an alternative mobile device and an advisory notification might be communicated.

19 Claims, 4 Drawing Sheets

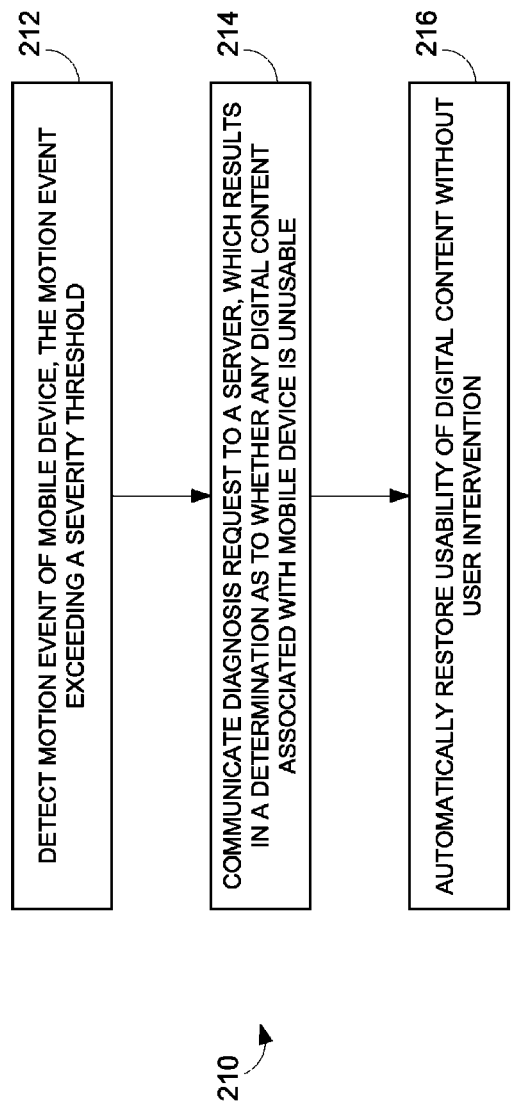

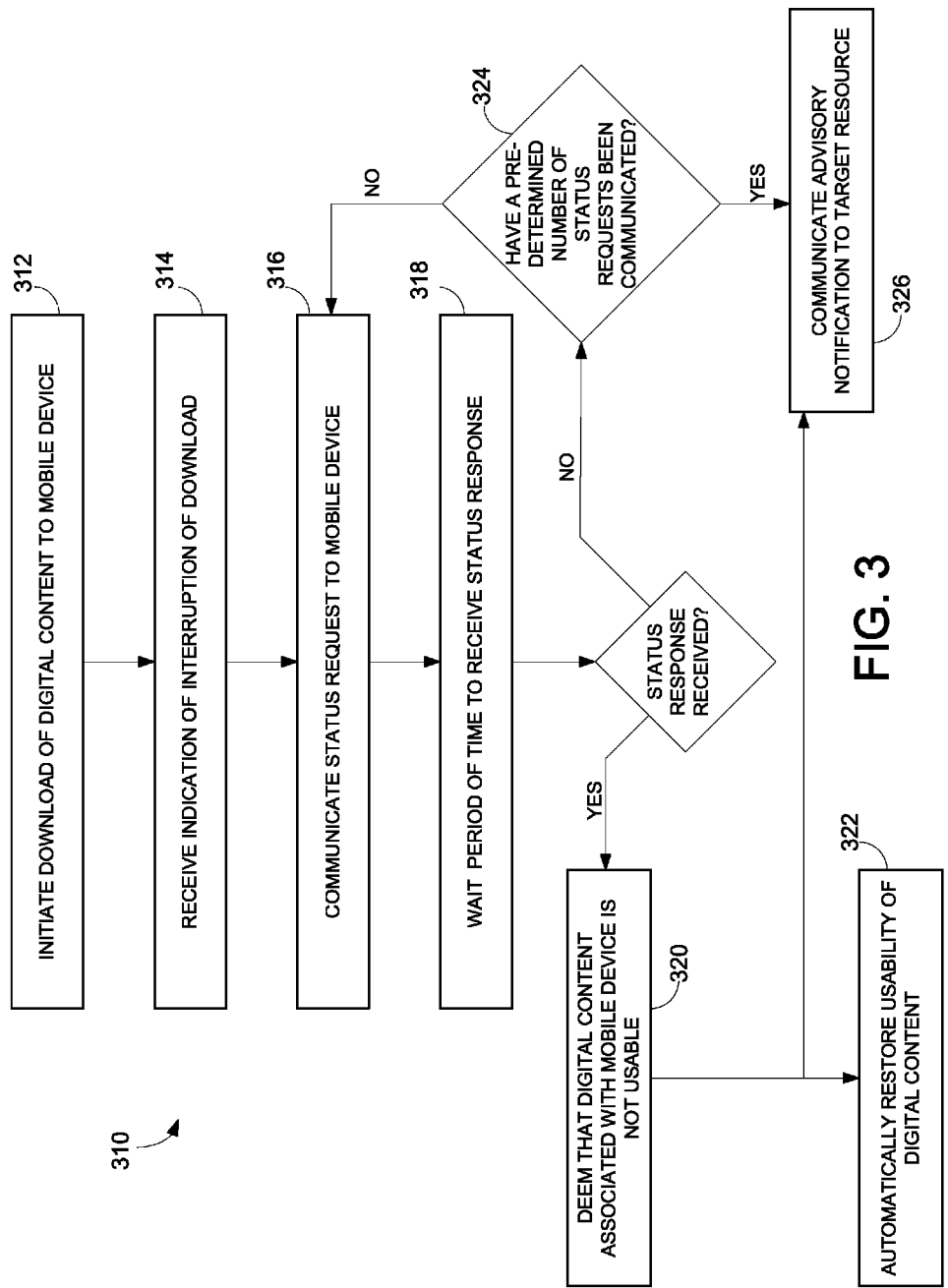

PROVIDING DIGITAL CONTENT USABILITY FOR A MOBILE DEVICE USER

CROSS REFERENCE TO RELATED APPLICATIONS

This application is a divisional application of U.S. Ser. No. 12/342,950, which was filed on Dec. 23, 2008. Applicant hereby claims the benefit of U.S. Ser. No. 12/342,950, which is incorporated herein by reference.

INTRODUCTION

A mobile device is often subjected to various movements, such as acceleration, deceleration, and impact with other objects. As a result of such movements, digital content stored on the mobile device might be rendered unusable. Moreover, if such movements occur in the middle of a download of digital content to the mobile device, the downloading digital content might become usable.

SUMMARY

Embodiments of the invention are defined by the claims below, not this summary. A high-level overview of various aspects of the invention are provided here for that reason, to provide an overview of the disclosure, and to introduce a selection of concepts that are further described in the detailed-description section below. This summary is not intended to identify key features or essential features of the claimed subject matter, nor is it intended to be used as an aid in isolation to determine the scope of the claimed subject matter.

In a first aspect, a set of computer-useable instructions provides a method of restoring a usability of digital content to a mobile device. The method includes detecting a motion event of the mobile device. The motion event relates to a motion experienced by the mobile device and exceeds a severity threshold. A diagnosis request is communicated to a server, which results in a determination as to whether any digital content associated with the mobile device is unusable. When the server determines that digital content is unusable, usability of the digital content is automatically restored without user intervention.

In another aspect, a set of computer-useable instructions provides a method of restoring digital content associated with a mobile device. The method includes initiating a download of requested digital content to the mobile device and receiving an indication of an interruption of the download. The method also includes communicating a status request to the mobile device to prompt a status response from the mobile device and waiting a period of time to receive the status response from the mobile device. If the status response is received from the mobile device within the period of time, the method includes deeming that at least a portion of any digital content associated with said mobile device is not useable. Alternatively, if the status response is not received from the mobile device within the period of time, the method includes communicating an advisory notification to a target resource. The advisory notification indicates that the mobile device might need to be serviced.

In a further aspect, additional steps might be performed prior to sending an advisory notification. For example, a condition might state that a predetermined number of status requests should be sent before sending an advisory notification. As such, prior to sending an advisory notification, a determination might be made as to whether or not a predetermined number of status requests have been communicated. If the predetermined number has not been communicated, one embodiment includes communicating another status request to the mobile device and giving the mobile device another opportunity to communicate a status response. If the predetermined number has been communicated, an advisory notification is communicated to a target resource.

BRIEF DESCRIPTION OF THE SEVERAL VIEWS OF THE DRAWINGS

Illustrative embodiments of the present invention are described in detail below with reference to the attached drawing figures, wherein:

FIGS. 2 and 3 each depict illustrative methods for carrying out embodiments of the present invention.

DETAILED DESCRIPTION

Embodiments of the present invention provide systems and methods related to ensuring usability of digital content on a mobile device. In exemplary aspects, digital content on a mobile device is rendered unusable, such as where a download is interrupted. In further aspects, the usability of the digital content is automatically restored to the mobile device without user intervention. In other embodiments in which the mobile device is unavailable an advisory notification is communicated. Some of the wording and form of description is done so herein to meet applicable statutory requirements. Although the terms "step" and/or "block" or "module" etc., might be used herein to connote different components of methods or systems employed, the terms should not be interpreted as implying any particular order among or between various steps herein disclosed unless and except when the order of individual steps is explicitly described.

Embodiments of the present invention may be embodied as, among other things: a method, system, or set of instructions embodied on one or more computer-readable media. Computer-readable media include both volatile and nonvolatile media, removable and nonremovable media, and contemplates media readable by a database, a switch, and various other network devices. By way of example, and not limitation, computer-readable media comprise media implemented in any method or technology for storing information. Examples of stored information include computer-useable instructions, data structures, program modules, and other data representations. Media examples include information-delivery media, RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data momentarily, temporarily, or permanently.

Figure 1A:
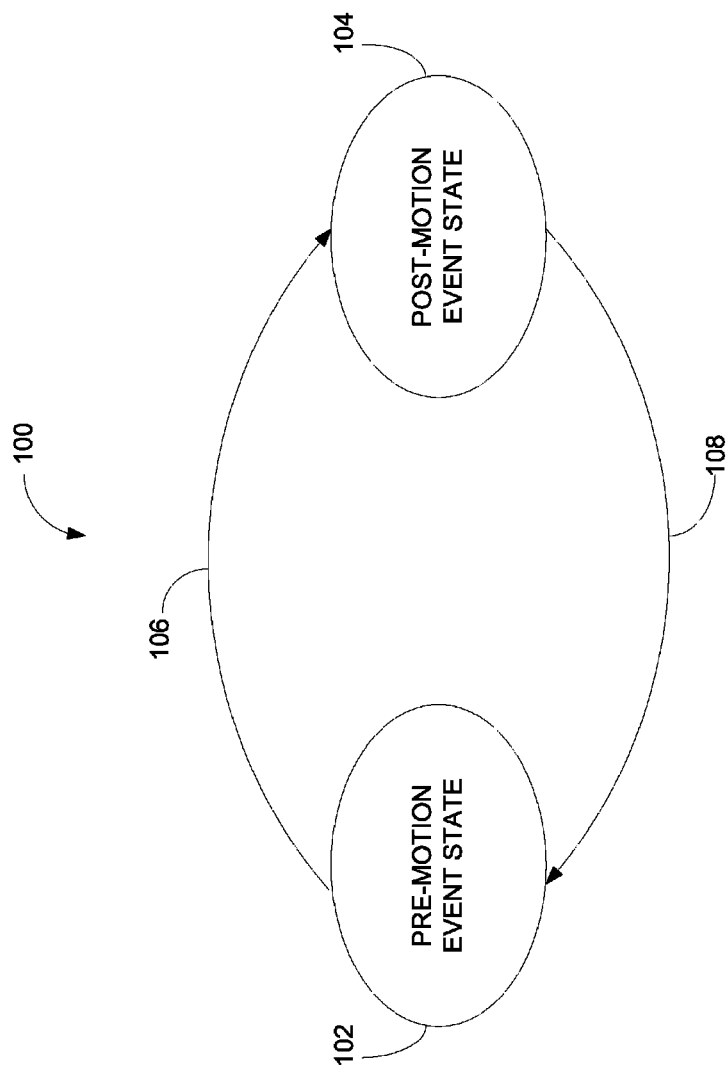
FIG. 1A depicts a state diagram illustrating aspect of the present invention.

Referring to FIG. 1A, a transition diagram, represented generally by numeral 100, is shown. The transition diagram illustrates possible transition states of a mobile device in accordance with an aspect of our technology. For example, a pre-motion event state 102 and a post-motion event state 104 are shown connected by arrows 106 and 108. Arrows 106 and 108 represent movement of a mobile device from one state to another. A pre-motion event state 102 describes a state of a mobile device prior to a specific motion event. Motion events can include a variety of episodes, such as an acceleration of a mobile device, a deceleration of a mobile device, and an impact of a mobile device with another object or surface. The pre-motion event state 102 and post-motion event state 104 are helpful to illustrate an aspect of the technology in which the substance of usable digital content on a mobile device is altered as a result of a motion event. For example, transition 106 represents a mobile device moving from a pre-motion event state 102 to a post-motion event state 106, such as might happen when a mobile device is dropped on a ground surface. In the pre-motion event state 102 the mobile device might have stored thereon a set of usable digital content. However, once the mobile device transitions 106 to a post-motion event state 104 (as a result of being dropped on the ground), the mobile device might have stored thereon a diminished set of usable digital content, as pre-motion event digital content might have been rendered unusable due to the impact with the ground. Transition 108 illustrates transition of a mobile device from post-motion event state 104 to pre-motion event state 102. For example, if usability of all digital content rendered unusable during transition 106 is restored to the mobile device, the mobile device transitions 108 from post-motion event state 104 to pre-motion event state 102.

Figure 1B:
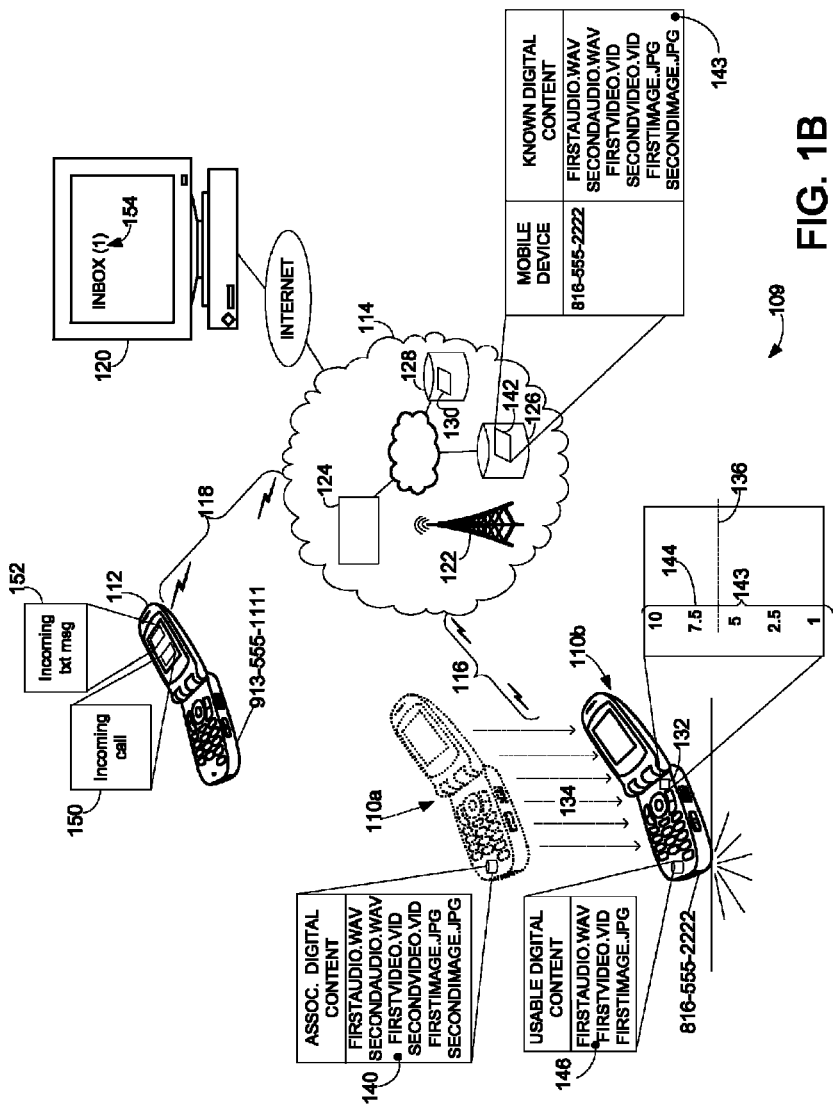
FIG. 1B depicts an illustrative operating environment suitable for practicing an embodiment of the present invention.

Turning now to FIG. 1B, an illustrative operating environment suitable for practicing an embodiment of the technology is provided and identified generally by numeral 109. FIG. 1B includes a mobile device, identified by 110a in a pre-motion event state and identified by 110b in a post-motion event state. Also shown is another mobile device 112. Although depicted as mobile phones, mobile devices 110a/b and 112 might also include a PDA or other device that is capable of communicating with a communications network, such as network 114, by way of a communication link 116 and 118 (variously referred to herein as "wireless connectivity"). Mobile device 110b is identified by number 816-555-2222 and mobile device 112 is identified by number 913-555-1111. Also in communication with network 114 is a computing device 120, which might communicate with network 114 via the Internet.

Network 114 might variously be referred to herein as a communications carrier (or just "carrier"). Illustrative carriers include Sprint Nextel Corporation; Verizon Communications Inc.; AT&T Inc.; Qwest Communications International Inc.; Deutsche Telekom AG (ADR); Cricket Communications, Inc.; Leap Wireless International; and the like. Components of network 114 such as a base station or communications tower 122 can provide wireless connectivity 116 and 118 in some embodiments. Furthermore, carrier 114 includes other components, such as a digital content usability component 124 and a wireless back-up component 126. Each of these components might include one or more servers and one or more datastores.

By way of wireless connectivity 116, mobile device 110a/b communicates with carrier 114. In an aspect of the technology, digital-content component 128 includes digital content 130 that might be purchased by a user of a mobile device 110a/b and downloaded to mobile device 110a/b. For example, in a pre-motion event state, mobile device 110a includes associated digital content 140, which is stored on mobile device 110a and might have been downloaded from network 114. In embodiments of the invention, associated digital content 140 also includes digital content that was requested by mobile device 110a and for which a download to mobile device 110a was initiated but might not have completed. Digital content includes various types of content such as digital literature, digital music, digital video, digital audio, digital imagery, digital multimedia, and digital TV. In an embodiment of the invention, wireless back-up component 126 includes an identification of known digital content 142 associated with mobile device 110a. For example, wireless back-up component 126 might include a listing of known digital content 142 associated with mobile device 110a. For illustrative purposes, a blown-up version of known digital content 142 of device 110a is shown and identified by 143. Moreover, wireless back-up component 126 might include a copy of known digital content 142 associated with mobile device 110a.

In aspects of the invention, mobile device 110a/b includes other components. For example, mobile device 110a/b might include a motion-detecting component 132 for detecting a motion event 134. In one embodiment, motion-detecting component 132 is an accelerometer. Motion event 134 might include any of a number of movements by mobile device 110a/b. For example, in embodiments of the invention, motion event 134 includes an acceleration of mobile device 110a/b, a deceleration of mobile device 110a/b, and an impact of mobile device 110a/b with another object or surface. FIG. 1 illustrates that in a pre-motion event state, mobile device 110a falls and strikes a ground surface, thereby transitioning a post-motion event state, shown by mobile device 110b. Motion event 134 might include a different level of severity as compared to other motion events of mobile device 110a/b. In one embodiment of the invention, the severity of motion event 134 is measured. For example, motion-detecting component 132 might measure a severity 143 of motion event 134. In one embodiment, a determination is made, such as by motion-detecting component 132, as to whether the a specific severity level 144 of a motion event 134 exceeds a minimum severity threshold 136.

In embodiments of the invention, motion event 134 causes all or a portion of associated digital content 140 to be rendered unusable. For example, motion event 134 might occur in the middle of a download of a portion of associated digital content 140, which results in an interruption of the download such that the downloading portion of associated digital content 140 is not usable by mobile device 110b. Also, motion event 134 might corrupt or otherwise render unusable by mobile device 110b associated digital content 140 that is stored on mobile device 110a/b. In post-motion event state, mobile device 110b includes usable digital content 146. Where digital content of associated digital content 140 has been rendered unusable, usable digital content 146 only includes a usable portion of associated digital content 140.

In aspects of the invention, upon detecting motion event 134, mobile device 110b communicates to network 114 an indication that mobile device 110a/b experienced motion event 134. For example, an indication might include a diagnosis request, which prompts network 114 to determine whether associated digital content 140 is unusable. In some embodiments, an indication is only communicated where severity 144 of motion event 134 exceeds minimum threshold 136.

In further embodiments, network 114 determines whether all or a portion of associated digital content 140 is unusable. Network 114 might be prompted to make such a determination by various triggering events. In one embodiment, network 114 determines usability of associated digital content 140 upon receipt of an indication that mobile device 110a/b experienced motion event 134 that exceeded minimum threshold 136. In an alternative aspect, network 114 determines usability of associated digital content 140 upon receipt of an indication that a download to mobile device 110a was interrupted.

Network 114 determines usability of associated digital content 140 through various procedures. In one embodiment, network 114 receives from mobile device 110b a list of usable digital content 146, which network 114 compares to known digital content 142. Through such a comparison, network 114 determines which portion of known digital content 142 is unusable; i.e., that portion of known digital content that is not also identified as usable digital content 146. In another embodiment, network 114 diagnostically scans mobile device 110*b* to determine which portion of known digital content 142 is unusable.

After determining that a portion of known digital content 142 is unusable, network 114 restores usability of the portion. In one embodiment, network 114 downloads to mobile device 110*b* the portion of known digital content that was determined to be unusable. Accordingly, mobile device 110*b* receives a usable version of the portion of known digital content that was determined to be unusable. In an alternative embodiment, network 114 determines that settings on mobile device 110*b* are in a modified state, which might have resulted from motion event 134, the modified state rendering a portion of known digital content 142 unusable. Accordingly, restoring usability might also include restoring a setting on mobile device 110*b*. In another example, network 114 might determine that all or a significant portion of known digital content 142 is unusable and restore usability by downloading all known digital content 142 to an alternative mobile device, such as mobile device 112.

In a further embodiment of our technology, network 114 receives an indication that a download to mobile device 110*a* was interrupted. An indication might be communicated from various sources such as mobile device 110*b*, a user of mobile device 110*a/b*, and a component that monitors download completion of digital content. In one embodiment, an indication is received at the same time as a diagnosis request. Alternatively, an indication might be received even if no diagnosis request is received. For example, if mobile device 110*b* is nonfunctional or simply does not have capabilities to communicate a diagnosis request, an indication might still be received even though no diagnosis request is communicated. Mobile device 110*b* might be non-functional due to various reasons, such as an impact in motion event 134.

After receiving an indication that a download was interrupted, network 114 communicates to mobile device 110*b* a status request. A status request might serve various purposes, such as prompting a status response from mobile device 110*b*. In one aspect, network 114 waits a period of time to receive a status response from mobile device 110*b* before taking subsequent action. A status response might include various indications of a current status of mobile device 110*b*, such as indications relating to operability, level of functionality, download success/failure, and experienced motion events.

In one aspect, if a status response is received from mobile device 110*b*, mobile device 110*b* is assessed to determine if any known digital content 142 is unusable. As previously described, usable digital content 146 might be compared to known digital content 142, diagnostic scans might be run, and mobile device settings might be checked. If all or a portion of known digital content 142 is deemed to be unusable, usability might be restored by one of the methods previously described. In addition, upon determining that all or a portion of known digital content 142 is unusable, in one aspect network 114 communicates an advisory notification to a target resource. An advisory notification might include various information, such as an indication that mobile device 110*b* might need to be serviced and an identification of known digital content 142 that was restored. A target resource might include various other devices or means of communication. For example, in one aspect target resource includes mobile device 112. In another aspect, target resource includes an email account on computing device 120. In aspects of the invention, an advisory notification is communicated by a phone call 150, a text message 152, or an email 154. Target resources might be identified in various manners. In one aspect, a user of mobile device 110*a/b* identifies and communicates to network 114 target resources.

In another aspect, if a status response is not received from mobile device 110*b* within a period of time, network 114 might communicate to mobile device 110*b* another status request, which again is directed at prompting a status response. Network 114 might continue to communicate status requests to mobile device 110*b* until a status response is received. In another aspect, a predetermined number of status requests is established, and network 114 communicates status requests until either a status response is received or the predetermined number of status requests have been communicated. In the event that a predetermined number of status requests have been communicated, and no status response has been received, network 114 might take subsequent alternative steps. For example, in one aspect, network 114 communicates to a target resource an advisory notification. In situations where mobile device 110*b* has failed to communicate a status response, an advisory notification might convey various information, such as an identification of unusable digital content, a notice that mobile device 110*b* is non-responsive, and a notice that mobile device 110*b* might need to be serviced.

Referring to FIG. 2, in one embodiment, the technology includes one or more computer-readable media having computer-useable instructions embodied thereon for performing a method (identified generally by numeral 210) of restoring a usability of digital content to a mobile device. The method includes at 212 detecting a motion event of the mobile device. The motion event relates to a motion experienced by the mobile device and exceeds a severity threshold. Step 214 includes communicating a diagnosis request to a server, which results in a determination as to whether any digital content associated with the mobile device is unusable. At step 216, when the server determines that digital content is unusable, usability of the digital content is automatically restored without user intervention.

Referring to FIG. 3, in another embodiment, the technology includes one or more computer-readable media having computer-useable instructions embodied thereon for performing a method (identified generally by numeral 310) of restoring digital content associated with a mobile device. The method includes at step 312 initiating a download of requested digital content to the mobile device and at step 314 receiving an indication of an interruption of the download. At step 316 a status request is communicated to the mobile device to prompt a status response from the mobile device, and step 318 includes waiting a period of time to receive the status response from the mobile device. The method also includes at step 320, if the status response is received from the mobile device within the period of time, deeming that at least a portion of any digital content associated with said mobile device is not useable. Alternatively, if the status response is not received from the mobile device within the period of time, step 326 includes communicating an advisory notification to a target resource, wherein the advisory notification indicates that the mobile device might need to be serviced.

FIG. 3 illustrates additional steps that might also be included in a method in accordance with another embodiment of our technology. For example, in one aspect the method includes sending a predetermined number of status requests before communicating an advisory notification. As such, a determination might be made at 324 as to whether or not a predetermined number of status requests have been communicated. If the predetermined number has not been communicated, one embodiment includes returning to step 316 and communicating a status request to the mobile device. In this situation, the method proceeds again from step 316, giving the mobile device another opportunity to communicate a status response. If the predetermined number has been communicated and no status response has been received, the method continues to step 326, which includes communicating an advisory notification to a target resource. Other embodiments illustrated in FIG. 3 include, after step 320, automatically restoring usability of digital content at step 322 and communicating an advisory notification at step 326.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

The invention claimed is:

1. A method of restoring a usability of digital content to a mobile device, the method comprising:
   detecting a motion event of said mobile device, wherein said motion event relates to a motion experienced by said mobile device and exceeds a severity threshold;
   communicating a diagnosis request to a server, which results in a determination as to whether any digital content associated with said mobile device is unusable, wherein the determination includes a comparison of usable digital content stored on the mobile device to a list of known digital content associated with the mobile device; and
   when said server determines that at least a portion of said any digital content is unusable, said portion comprising a digital-content portion, automatically restoring usability of said digital-content portion without user intervention.

2. The method of claim 1 wherein said motion event comprises one or more of an impact, an acceleration, and a deceleration.

3. The method of claim 1 wherein said any digital content associated with said mobile device comprises digital content that should be stored on said mobile device.

4. The method of claim 1 wherein said any digital content associated with said mobile device comprises digital content that was downloading to said mobile device when said motion event was experienced.

5. The method of claim 1 wherein said mobile device comprises an accelerometer, which detects said motion event.

6. The method of claim 1 wherein said determination comprises said server executing a diagnostic scan of said mobile device.

7. The method of claim 1, wherein said list of known digital content associated with said mobile device is stored in a wireless backup system.

8. The method of claim 1 wherein said digital-content portion is unusable because transmission was interrupted.

9. The method of claim 1 wherein said digital-content portion is unusable because said digital-content portion is corrupted.

10. The method of claim 1 wherein said automatically restoring comprises one or more of:
    receiving a usable version of said digital-content portion; and
    restoring a setting on said mobile device that enables said usability of said mobile device.

11. Non-transitory computer-readable media storing computer-useable instructions thereon for performing a method of restoring a usability of digital content to a mobile device, the method comprising:
    measuring a motion-event parameter that describes a motion event experienced by the mobile device;
    comparing the motion-event parameter to a severity threshold to determine that the motion-event parameter exceeds the severity threshold;
    transmitting to a server a notification, which indicates the mobile device experienced the motion event, and a list of usable digital content stored on the mobile device, wherein the list of usable digital content includes a set of digital content, wherein the notification and the list are transmitted when the motion-event parameter exceeds the severity threshold, and wherein the notification and the list are not transmitted when the motion-event parameter does not exceed the severity threshold; and
    receiving from the server an item of digital content item that was associated with the mobile device before the motion event and that is not included in the set of digital content included in the list of usable digital content.

12. The media of claim 11 wherein said motion event comprises one or more of an impact, an acceleration, and a deceleration.

13. The media of claim 11 wherein the item of digital content that was associated with the mobile device comprises digital content that was downloading to said mobile device when said motion event was experienced.

14. The media of claim 11 wherein said mobile device comprises an accelerometer, which detects said motion event.

15. The media of claim 11 wherein the item of digital content is not included in the list of usable digital content because transmission was interrupted when the item of digital content was downloading to the mobile device.

16. Non-transitory computer-readable media storing computer-useable instructions thereon for performing a method of restoring a usability of digital content to a mobile device, the method comprising:
    detecting a motion event experienced by the mobile device, which includes a set of digital content;
    in response to the motion event, automatically transmitting to a server a notification, which indicates the mobile device experienced the motion event;
    receiving from the server a diagnostic scan that is executed by the mobile device and that deems an item of digital content included in the set of digital content to be not usable;
    transmitting another notification to the server indicating that the item of digital content is not usable; and
    receiving from the server a restoration of the item of digital content that was included in the set of digital content and that was deemed not usable by the diagnostic scan.

17. The media of claim 16 wherein said motion event comprises one or more of an impact, an acceleration, and a deceleration.

18. The media of claim 16 wherein said mobile device comprises an accelerometer, which detects said motion event.

19. The media of claim 16 wherein receiving a restoration of the item of digital content includes receiving a usable version of the item of digital content.

* * * * *